United States Patent
Narasimha et al.

(10) Patent No.: US 10,051,530 B2
(45) Date of Patent: Aug. 14, 2018

(54) HARQ ADAPTATION FOR ACQUISITION OF NEIGHBOR CELL SYSTEM INFORMATION

(71) Applicant: Google Technology Holdings LLC, Mountain View, CA (US)

(72) Inventors: Murali Narasimha, Vernon Hills, IL (US); Ravi Kuchibhotla, Gurnee, IL (US)

(73) Assignee: Google Technology Holdings LLC, Mountain View, CA (US)

(*) Notice: Subject to any disclaimer, the term of this patent is extended or adjusted under 35 U.S.C. 154(b) by 0 days.

(21) Appl. No.: 15/337,537

(22) Filed: Oct. 28, 2016

(65) Prior Publication Data

US 2017/0048762 A1    Feb. 16, 2017

Related U.S. Application Data

(62) Division of application No. 14/926,191, filed on Oct. 29, 2015, now Pat. No. 9,510,250, which is a division
(Continued)

(51) Int. Cl.
*H04W 36/00* (2009.01)
*H04L 1/18* (2006.01)
*H04L 1/00* (2006.01)

(52) U.S. Cl.
CPC ....... *H04W 36/0061* (2013.01); *H04L 1/0009* (2013.01); *H04L 1/1861* (2013.01);
(Continued)

(58) Field of Classification Search
CPC ......... H04W 36/0061; H04W 36/0088; H04L 1/0009; H04L 1/1861; H04L 1/1887; H04L 1/0014
(Continued)

(56) References Cited

U.S. PATENT DOCUMENTS 7,808,953 B2    10/2010    Kuroda et al.
2001/0008521 A1    7/2001    Virtanen
(Continued)

FOREIGN PATENT DOCUMENTS

CN    101043697 A    9/2007
CN    101335975 A    12/2008
(Continued)

OTHER PUBLICATIONS

Notification of Reexamination for Chinese Patent Application No. 201080028131.0, dated Jun. 28, 2017.
(Continued)

*Primary Examiner* — Stephen J Clawson
(74) *Attorney, Agent, or Firm* — Lerner, David, Littenberg, Krumholz & Mentlik, LLP

(57) ABSTRACT

A method in a mobile station including receiving an order from a serving cell for system information acquisition of a neighbor cell, wherein the order includes at least a physical cell identifier and a time limit for acquisition of the system information of the neighbor cell, acquiring the system information of the neighbor cell within the time limit for the acquisition of the system information, and reporting at least a part of the acquired system information to the serving cell.

2 Claims, 2 Drawing Sheets

Related U.S. Application Data of application No. 12/792,194, filed on Jun. 2, 2010, now Pat. No. 9,204,347.

(60) Provisional application No. 61/219,547, filed on Jun. 23, 2009.

(52) U.S. Cl.
CPC ....... *H04L 1/1887* (2013.01); *H04W 36/0088* (2013.01); *H04L 1/0014* (2013.01)

(58) Field of Classification Search
USPC .......................................................... 370/252
See application file for complete search history.

(56) References Cited

U.S. PATENT DOCUMENTS

| | | | |
|---|---|---|---|
| 2002/0071407 A1 | 6/2002 | Koo et al. | |
| 2003/0043764 A1 | 3/2003 | Kim et al. | |
| 2003/0129947 A1* | 7/2003 | Matsuki | H04L 1/0002 455/67.11 |
| 2004/0085935 A1* | 5/2004 | Robinson | H04W 48/08 370/335 |
| 2004/0110511 A1 | 6/2004 | Schmidt et al. | |
| 2004/0202113 A1* | 10/2004 | Moon | H04L 1/0002 370/252 |
| 2005/0249138 A1* | 11/2005 | Heo | H04W 52/146 370/311 |
| 2006/0034245 A1 | 2/2006 | Nguyen | |
| 2006/0146762 A1 | 7/2006 | Kuroda et al. | |
| 2006/0251014 A1 | 11/2006 | Castor et al. | |
| 2007/0116002 A1 | 5/2007 | Nakamata | |
| 2007/0173239 A1* | 7/2007 | Scott | H04L 29/06027 455/417 |
| 2007/0263585 A1* | 11/2007 | Duan | H04W 28/02 370/342 |
| 2007/0280170 A1* | 12/2007 | Kawasaki | H04W 72/1231 370/331 |
| 2007/0298825 A1* | 12/2007 | Kayama | H04W 28/22 455/522 |
| 2008/0027207 A1 | 1/2008 | Jenkins | |
| 2008/0043619 A1 | 2/2008 | Sammour et al. | |
| 2008/0059859 A1 | 3/2008 | Marinier et al. | |
| 2008/0270866 A1 | 10/2008 | Choi et al. | |
| 2009/0052367 A1 | 2/2009 | Cai et al. | |
| 2009/0176490 A1* | 7/2009 | Kazmi | H04J 11/0093 455/434 |

FOREIGN PATENT DOCUMENTS

| | | |
|---|---|---|
| JP | 2006191312 A | 7/2006 |
| JP | 2006279635 A | 10/2006 |
| JP | 2006526313 A | 11/2006 |
| JP | 2007258845 A | 10/2007 |
| JP | 2009515398 A | 4/2009 |
| RU | 2316895 C2 | 2/2008 |
| WO | 2004100588 A1 | 11/2004 |
| WO | 2005020474 A1 | 3/2005 |
| WO | 2008152130 A1 | 12/2008 |

OTHER PUBLICATIONS

Japan Patent Office. "Office Action" for Japanese Patent Application No. 2013-089281 dated Feb. 12, 2014, 3 pages.
3GPP TSG RAN WG2 #66bis, R2-093927 "Minimizing Impact of MIB and SIB1 Reading" Motorola; Los Angeles, USA; Jun. 29-Jul. 3, 2011, 2 pages.
3GPP TSG RAN WG2 #66bis, R2-093924 "Reading MIB and SIB1 of HeNBs" Motorola; Los Angeles, USA; Jun. 29-Jul. 3, 2011, 3 pages.
Japanese Office Action for Japanese Patent Application No. 2012-517562 dated Jan. 22, 2013, 5 pages.
Ericsson "Mechanism for UE measurements and reporting of global cell identity", 3GPP Draft; R2-074930, 3rd Generation Partnership Project (3GPP), Mobile Competence Centre; 650, Route Des Lucioles; F-06921 Sophia-Antipolis Cedex; France, vol. RAN WG2. no Jeju; Nov. 12, 2007, Nov. 12, 2007, all pages.
Patent Cooperation Treaty, "PCT Search Report and Written Opinion of the International Searching Authority", for International Application No. PCT/US2010/037952, Dec. 8, 2010, 16 pages.
Russian Decision on Grant for Application No. 2012102054 dated Jun. 30, 2014.
Qualcomm Europe, Optimized handover in the presence of PCI confusion, 3GPP TSG RAN WG2 62bis (Tdoc-R2-083268), Warsaw, Poland, Jun. 24, 2008, revealed in the Internet: <http://www.3gpp.org/ ftp/ t sg_ran/wg2_ri2/TSGR2_62bis/Docs/>.
Chinese Office Action for Application No. 201080028131.0 dated Aug. 4, 2014.
Extended European Search Report for Application No. 13175225.5 dated Aug. 4, 2014.
European Examination Report for Application No. 10731632.5 dated Oct. 29, 2014.
Decision of Grant for Russian Patent Application No. 2014133526 dated Nov. 26, 2015.
Notification of the Fifth Office Action for Chinese Patent Application No. 201080028131.0 dated Apr. 13, 2016.
Decision of Rejection for Chinese Patent Application No. 201080028131.0, dated Sep. 5, 2016.

* cited by examiner

HARQ ADAPTATION FOR ACQUISITION OF NEIGHBOR CELL SYSTEM INFORMATION

CROSS REFERENCE TO RELATED APPLICATIONS

The present application is a divisional of U.S. patent application Ser. No. 14/926,191, filed on Oct. 29, 2015, which is a divisional of U.S. patent application Ser. No. 12/792,194, filed on Jun. 2, 2010, now issued as U.S. Pat. No. 9,204,347, issued on Dec. 1, 2015, which claims the benefit under 35 USC 119(e) to U.S. Provisional Application No. 61/219,547 filed on Jun. 23, 2009, the disclosures of which are hereby incorporated by reference herein.

FIELD OF DISCLOSURE

The present disclosure relates generally to wireless communications and more specifically to acquisition of system information of neighboring cells.

BACKGROUND

The reading of neighbor cell system information by a mobile station in a wireless communication network is beneficial in many situations. One such situation arises in $3^{rd}$ Generation Partnership Project (3GPP) Long Term Evolution (LTE) networks in the presence of Home eNBs (HeNBs), which are also referred to as femto cells. An LTE HeNB is a low power eNB that provides coverage in hotspots, homes etc. to a small number of users. A physical cell identifier (PCID) uniquely identifies each macro cell, since the network is planned and deployed such that macro cells with the same PCID are separated by a very large distance to facilitate re-use of PCIDs. In contrast, HeNBs are deployed by users in an uncoordinated fashion with no PCID planning As a result it is possible to have two HeNBs under the coverage of a macro cell that use the same PCID, which may result in PCID confusion.

For handover, network needs to know precisely to which cell to handover a mobile station. One approach to resolve PCID confusion is for the mobile station to read the unique cell identifier (cell global ID or CGI) or CSG ID in System Information block 1 of the target HeNB and report the CGI or the CSG ID. However, mobile stations in connected mode in LTE Rel-8 are not required to acquire system information messages from neighboring cells. Reading neighbor cell system information can cause significant interruptions to the ongoing connection with the serving cell. This interruption is particularly problematic when there is an ongoing voice call. Thus it is desirable to reduce loss of data packets (e.g., voice frames) transmitted between a mobile station and serving cell when the mobile station attempts to acquire neighbor cell system information.

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
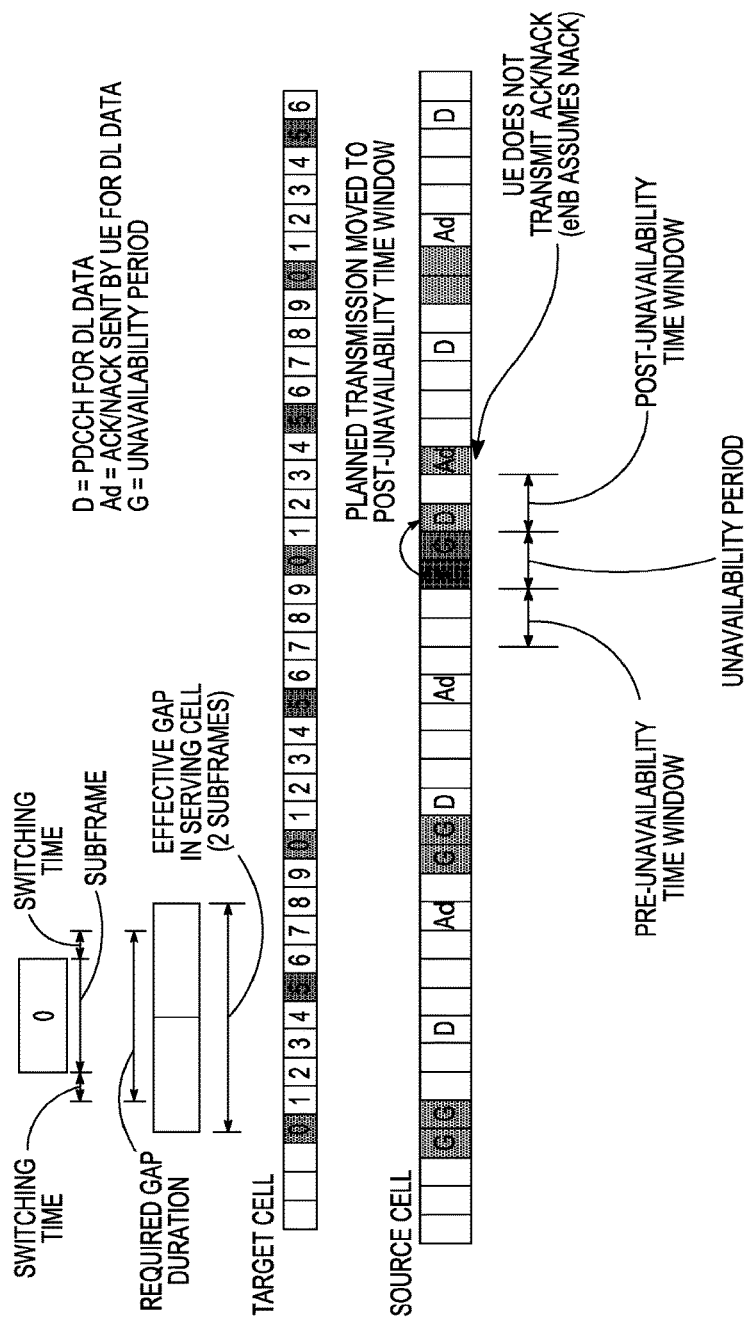
FIG. 1 illustrates a method for receiving system information transmitted by a neighbor cell by shifting HARQ transmissions.
Figure 2:
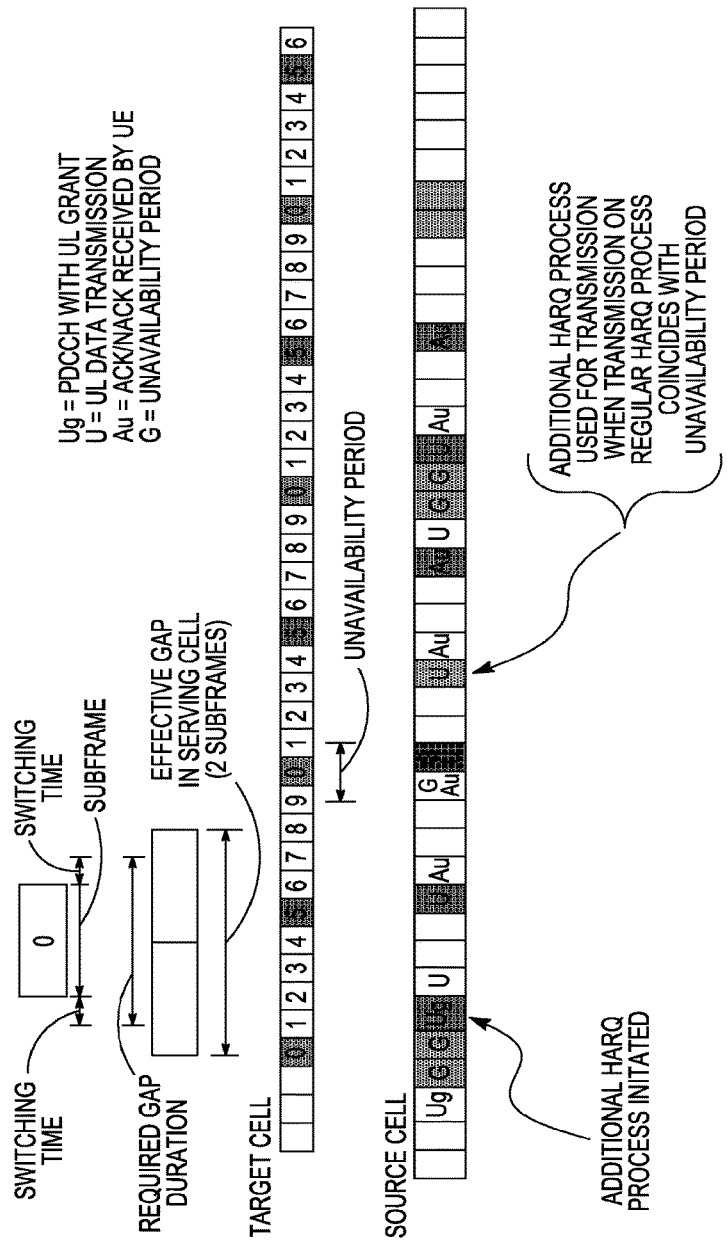
FIG. 2 illustrates a method for receiving system information transmitted by a neighbor cell by using an additional HARQ process.

The various embodiments of the present disclosure minimize or at least reduce the loss of packets when the mobile station tries to read neighbor cell system information. In some embodiment, the HARQ behavior on the communication link to the serving cell is adjusted for this purpose. The disclosure relies on knowledge of the target cell's frame timing to reduce the likelihood of missing HARQ transmissions to and from the serving cell. The embodiments are described in terms of a 3GPP Long term evolution (LTE) system. The system information messages of the neighbor cell that are considered include the Master Information Block (MIB) and System Information Block 1 (SIB1). However, it should be clear that the teachings of the disclosure are equally applicable to other wireless communication systems and other types of system information messages.

In instances, the serving cell determines that target cell information, which is provided through the system information of the target cell. For example, when a measurement report received from a mobile station indicates that a target cell is a potential handover candidate, the serving cell may determine that the target cell's cell global identifier is needed To obtain the target cell information, the serving cell sends a system information acquisition order indicating or identifying the physical cell identity (PCID) of the target cell for which additional information is required. In some embodiments, this order includes a system information acquisition time limit, wherein the mobile station is expected to acquire the system information of the identified target cell within the time limit.

In some embodiments, until the expiry of the system information acquisition time limit, the serving cell uses a lower or reduced voice codec rate for ongoing voice calls without lowering the resource allocation. This reduces the size of the voice packets that are transmitted and therefore minimizes the number of HARQ retransmissions needed to successfully receive a voice packet. This in turn reduces the number of lost voice packets due to the mobile station attempting to receive system information messages from the target cell since the same radio resources originally used for a larger packet is now used for a smaller coded voice packet. For example, the serving network can use only ½rate AMR voice during this period while the resource allocation continues to be based on full rate AMR voice.

This technique can be applied to both uplink and downlink voice packets, i.e. both base station and mobile station operate at a reduced data rate. Furthermore, it can be applied to obtain other system information as well, for example system information blocks 2-8 defined according to the LTE release 8 specification in 3GPP TS 36.331.

Although the description above indicates that the serving cell triggers the acquisition of the neighbor cell system information, it should be clear that the mobile station can also autonomously trigger the acquisition of the system information.

According to a second embodiment, it is assumed that the serving cell knows the frame timing difference between its transmission and that of the target cell. This information can be provided by the mobile station in a measurement report, or it may be provided by the target cell by using signaling mechanisms available in the network. Alternatively, the source cell and target cell may be frame synchronized implying a frame timing difference of zero between the serving cell and the target cell. In LTE systems, since MIB transmissions occur in sub-frame 0 and SIB1 transmissions occur in sub-frame 5, if the serving cell knows the frame timing difference between itself and the target cell, it can determine when the mobile station is likely to tune to the target cell. Consequently, based on time overlap of HARQ transmissions with transmissions of MIB or SIB1 in the target cell, the serving cell can determine which HARQ transmissions could be missed by the mobile station.

The sub-frames in the serving cell that overlap the transmissions of MIB or SIB1 of the target cell are referred to as "unavailability periods". According to this embodiment, the following technique is used to minimize missed transmissions:

The serving eNB sends a system information acquisition order indicating the PCID of the target cell. This order includes a system information acquisition time limit. The mobile station is expected to acquire the system information within this time limit.

Within the system information acquisition time limit a "pre-unavailability time window" and a "post-unavailability time window" are defined around each unavailability period. The pre-unavailability time window consists of n1 sub-frames before the start of the unavailability period and the post-unavailability time window consists of n2 sub-frames after the end of the unavailability period.

The mobile station monitors for PDCCH in the pre- and post-unavailability time windows.

If the timing of a planned HARQ transmission is such that it occurs during the unavailability period, then it is instead transmitted during the pre- or post-unavailability time windows. Note that this principle can be applied to both downlink transmissions and uplink transmissions. As an enhancement, instead of replacing the planned transmission, an additional transmission can be performed in the pre or post unavailability time windows.

HARQ Ack/Nack behavior: To allow for easier implementation, the feedback to a transmission in the pre- or post-unavailability period could be assumed to be a Nack. In other words, it is not necessary to assign Ack/Nack resources for the shifted transmission. As an alternative, the Ack/Nack resources corresponding to the originally planned transmission could be used. As another alternative, new Ack/Nack resources can be assigned for the shifted transmission.

The mobile station attempts to acquire the necessary system information from the target cell during the unavailability periods. If successfully acquired, the mobile station may report a part or all of the required acquired system information to the serving cell. Alternatively, the mobile station can simply use the acquired system information for internal processing purposes. For example, upon acquiring the CSG identifier in SIB1, the mobile station may determine that it is not allowed to access the target cell, and therefore not report the information to the serving cell.

According to a third embodiment, it is assumed that the serving cell knows the frame timing difference between its transmission and that of the target cell. As in the second embodiment, this information can be provided by the mobile station in a measurement report, or it may be provided by the target cell by using signaling mechanisms available in the network. Alternatively, the source cell and target cell may be frame synchronized implying a frame timing difference of zero. The following steps are performed:

The serving cell sends a system information acquisition order indicating the PCID of the target cell. This order includes a system information acquisition time limit. The mobile station is expected to acquire the system information within this time limit.

The mobile station is assigned an additional HARQ process with corresponding resources for transmission of packets and transmission of Ack/Nacks. This assignment of the additional HARQ process could be included in the system information acquisition order. Note additional HARQ process could be assigned for uplink transmissions and/or downlink transmissions.

The additional HARQ process is used only if a planned HARQ transmission coincides with an unavailability period. Specifically, if a planned HARQ transmission coincides with an unavailability period, the next transmission opportunity on the additional HARQ process is used instead. Alternatively, if a planned HARQ transmission coincides with an unavailability period, then a transmission opportunity on the additional HARQ process that occurs before the planned HARQ transmission can be used.

The additional HARQ process is suspended at the end of the system information acquisition time limit.

As in the second embodiment, the mobile station attempts to acquire the necessary system information from the target cell by receiving the system information messages when they are transmitted by the target cell. If successfully acquired, the mobile station may report a part or all of the acquired system information to the serving cell. Alternatively, the mobile station can simply use the acquired system information for internal processing purposes (for example, upon acquiring the CSG identifier in SIB1, the mobile station may determine that it is not allowed to access the target cell, and therefore not report the information to the serving cell).

In the second and third embodiments described above, it is assumed that the serving cell knows the difference between its frame timing and that of the target cell (mobile station reports this frame timing difference).

In the description of embodiments above the reading of the system information is triggered by an order from the serving base station. It should be noted that it is equally possible to have the mobile station trigger the reading of the system information.

According to a fourth embodiment, since the mobile station is aware of the MIB and SIB1 transmission occasions of the target cell, it chooses its unavailability periods based on status information related to the HARQ processes. For example, if a MIB or SIB1 transmission in the target cell overlaps a planned HARQ transmission in the serving cell and the HARQ transmission is one of the first n transmissions of a packet, then mobile station attempts to receive the MIB or SIB1 of the neighbor cell. If the planned HARQ transmission is not one of the first n transmissions of a packet, then the mobile station receives the HARQ transmission. This allows the mobile station to receive system information messages when they overlap earlier transmissions of a packet while allowing the packet to be still received in the later HARQ transmissions.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

The invention claimed is:

1. A method in a mobile station for acquiring neighbor cell system information, the method comprising:
- receiving, at the mobile station, an order from a serving cell for system information acquisition of a neighbor cell,
- the order for system information acquisition including at least a physical cell identifier of the neighbor cell and a time limit for acquisition of the system information of the neighbor cell;
- within the time limit for acquisition of the system information of the neighbor cell, operating the mobile station at a reduced voice codec rate during acquisition of the system information while resource allocation for the voice codec continues to be based on a full voice codec rate such that the size of voice packets is reduced to thereby reduce a number of retransmissions needed to successfully receive a voice packet and reduce a number of voice packets that are lost during acquisition of the system information,
- acquiring, at the mobile station, the system information of the neighbor cell within the time limit for the acquisition of the system information, and
- reporting, from the mobile station, at least a part of the acquired system information to the serving cell.

2. The method according to claim 1, wherein receiving the order for system information acquisition of the neighbor cell includes receiving an order to acquire an identifier of a neighbor cell from the system information transmitted by the neighbor cell.

* * * * *